United States Patent
Breda

[11] Patent Number: 6,040,899
[45] Date of Patent: Mar. 21, 2000

[54] OPTICAL VELOCIMETRIC PROBE

[75] Inventor: Jean-Marc Breda, Vendome, France

[73] Assignee: Sextant Avionique, Velizy Villacoublay, France

[21] Appl. No.: 09/011,754

[22] PCT Filed: Jun. 24, 1997

[86] PCT No.: PCT/FR97/01122

§ 371 Date: Feb. 25, 1998

§ 102(e) Date: Feb. 25, 1998

[87] PCT Pub. No.: WO97/50004

PCT Pub. Date: Dec. 31, 1997

[30] Foreign Application Priority Data

Jun. 25, 1996 [FR] France ................................. 96 07857

[51] Int. Cl.⁷ .......................................................... G01P 3/36
[52] U.S. Cl. ............................................. 356/28.5; 356/28
[58] Field of Search ................................................ 356/28.5

[56] References Cited

U.S. PATENT DOCUMENTS

| | | |
|---|---|---|
| 3,547,540 | 12/1970 | Shigemoto . |
| 3,825,346 | 7/1974 | Rizzo . |
| 4,242,194 | 12/1980 | Steiner et al. ............................ 356/28 |
| 4,589,070 | 5/1986 | Kyrazis .................................. 356/28.5 |
| 4,610,540 | 9/1986 | Mossey .................................. 356/28.5 |
| 4,875,770 | 10/1989 | Rogers et al. ......................... 356/28.5 |
| 4,925,297 | 5/1990 | Brown .................................. 356/28.5 |
| 5,006,813 | 4/1991 | Khoshnevisan et al. . |
| 5,164,784 | 11/1992 | Waggoner ............................. 356/28.5 |
| 5,229,844 | 7/1993 | Breda . |
| 5,502,558 | 3/1996 | Menders et al. ....................... 356/28.5 |

FOREIGN PATENT DOCUMENTS

| | | |
|---|---|---|
| 0012396 | 6/1980 | European Pat. Off. . |
| 0489474 | 6/1992 | European Pat. Off. . |
| 1546508 | 5/1969 | Germany . |

OTHER PUBLICATIONS

H. W. Mocker et al; Applied Optics, v. 33, No. 27, p. 6457, Sep. 20, 1994.

*Primary Examiner*—Stephen C. Buczinski
*Attorney, Agent, or Firm*—Oblon, Spivak, McClelland, Maier & Neustadt, P.C.

[57] ABSTRACT

An optical velocimetry probe used in avionics. A measurement volume through which particles can pass is illuminated with a light beam. Light which is backscattered by the particles causes interference with a reference beam which is taken from the original beam. A photodetector detects the interference.

12 Claims, 3 Drawing Sheets

OPTICAL VELOCIMETRIC PROBE

BACKGROUND OF THE INVENTION

1. Field of the Invention

The field of the invention is that of optical velocimetric probes for defining the velocity of particles in relative motion with respect to the probe.

2. Discussion of the Background

There are currently various optical devices for optically measuring the velocity of particles having small dimensions (typically less than one micron).

For this, use may be made of probes operating on the principle of the longitudinal Doppler effect. A light source sends a beam onto a particle, and the back-scattered light is analysed; the velocity of this particle gives the back-scattered energy a variation in frequency with respect to the frequency of the incident radiation. In order to obtain a significant measurement, it is essential to provide a source whose wavelength is perfectly known, in order to determine a precise variation with respect to the said wavelength.

Other optical systems currently known comprise means for making two incident rays interfere in a measurement volume through which particles whose velocity is to be measured pass. The energy back-scattered by the particles carries an indication of the velocity. The benefit of interferometry resides in the fact that it is not necessary to provide a perfectly monochromatic source. By way of example, FIG. 1 illustrates a device which uses this type of interference.

A source 11 of the diode laser type emits a light beam $L_1$ in the direction of an optical splitter 12 which can generate two light beams $L_{11}$ and $L_{12}$ in the direction of a return optical system MR, so that the two beams $L_{11}$ and $L_{12}$ interfere in the measurement volume MV, by means of a lens 13, and thereby create interference fringes which are crossed by a particle P passing through the measurement volume in the direction DZ indicated in FIG. 1. The said particle back-scatters light, in the form of the beam $L_2$, and this light is collimated through the lens 13 then focused through a lens 14 in the direction of photodetection means 15. The means are coupled to a signal processing device 16 which can extract information relating to the velocity of the particle on the basis of the electrical signal delivered by the photodetection means 15.

The major problem of this type of conventional fringe probe resides in the weak energy back-scattered by submicron particles, this energy being poorly suited to the sensitivity of conventional photodetectors.

SUMMARY OF THE INVENTION

This is why the invention proposes a velocimetric optical probe comprising means for amplifying the back-scattered energy.

More precisely, the invention relates to an optical velocimetric probe comprising means for illuminating, with a light beam 1, a measurement volume through which particles can pass which are in relative motion with respect to the probe, and means for optical detection of a light beam 2 comprising a light beam 3 back-scattered by the particles, in order to produce an electrical signal in response to the passage of a particle through the measurement volume (representative of the relative velocity of the particle with respect to the probe), characterized in that it includes means for producing interference between a reference light beam 4 derived from the light beam 1 and the light beam 3, the said interference being contained in the light beam 2 and the wavefronts of the light beams 3 and 4 being of the same geometry.

This type of probe is particularly well-suited to aeronautical applications, using the velocity of particles constituting atmospheric aerosols.

It may, in particular, satisfy requirements in this field insofar as, at present, devices for measuring the velocity of an aircraft comprise protuberances, arranged at the front of the aircraft and also referred to as Pitot tubes, which determine the total pressure and the static pressure. Since this type of device is placed outside the aircraft, it needs to be heated constantly so as not to ice up and so that it provides reliable information. Furthermore, these are protuberances which entail a non-negligible increase in the aerodynamic drag of the aircraft, which increases consumption.

It should be noted that, in the field of avionics, optical velocimetric probes based on the aforementioned longitudinal Doppler effect would be unsatisfactory insofar as on-board devices should not comprise sources which are too bulky, but instead sources of the diode laser type, which have weaker power and have excessive spectral emission widths ill-suited to the requirements involved with the longitudinal Doppler effect.

According to a variant of the invention, the optical velocimetric probe may include means for making the wavefronts of the beams 3 and 4 identical, and in particular in the case where the delivered light beam 1 is parallel and has a plane wavefront, whereas the back-scattered light beam 3 is divergent and has a spherical wavefront.

According to a variant of the invention, the optical velocimetric probe may, as means for producing the light beam 1, include a source of the diode laser type delivering an output beam 1 which is divergent and of elliptical cross-section. This source is advantageously coupled to a collimating/anamorphic assembly capable of producing a parallel light beam of circular cross-section.

The velocimetric probe may also include means for deviating the light beam 1 so as to bring at least a part of this beam in the direction of the light beam 3.

It may include means for focusing the light beams 3 and 4, so as to make the said beams interfere in the vicinity of the optical detection means.

According to a variant of the invention, the optical velocimetric probe comprises means for determining a plurality of spatial components of the velocity of the particles with respect to the probe.

More precisely, the velocimetric probe is one which is characterized in that it includes means for alternately producing at least two light beams 1 and 1' illuminating the measurement volume at different incidences, so as to detect different spatial components of the relative velocity of the particle with respect to the probe.

BRIEF DESCRIPTION OF THE DRAWINGS

The invention will be understood more clearly, and other advantages will emerge, on reading the following description which is given without implying any limitation and with the aid of the appended figures, in which.

DISCUSSION OF THE PREFERRED EMBODIMENTS

In general, the optical velocimetric probe according to the invention essentially comprises three parts:

- a first part, which may be referred to as the emission channel 1, originating from the means for illuminating a measurement volume with a light beam;
- a second part, referred to as the reference channel, constituting the light beam 4;
- a third part which collects the energy back-scattered by particles passing through the measurement volume and which focuses it in the vicinity of the optical detection means, where this energy interferes with the reference channel; this last part is referred to as the reception channel.

The various channels, emission, reference and reception, in an illustrative embodiment according to the invention, serve to demonstrate the various characteristics of the invention. The optical velocimetric probe is one which is designed for aeronautical applications that can be installed on board an aircraft, making it possible to estimate the velocity of the aircraft precisely, by estimating the relative velocity of atmospheric aerosol particles with respect to the said aircraft.

Figure 2:
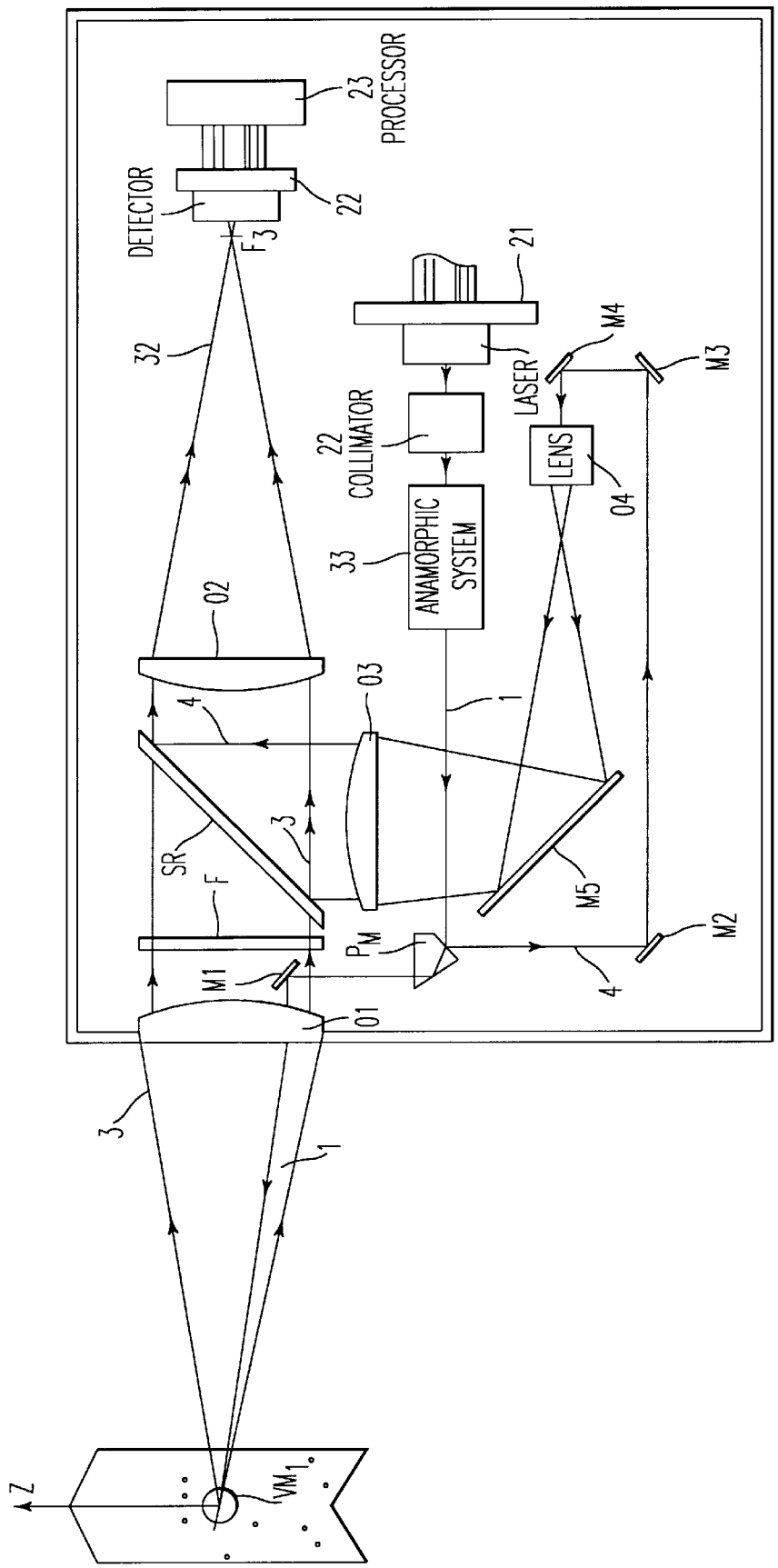
FIG. 2 illustrates an illustrative embodiment of an optical probe according to the invention.

FIG. 2 illustrates the entire on-board probe, in which the first part, referred to as the emission channel, creates a measurement volume outside the probe, at a distance which may typically be of the order of 100 mm. This emission channel comprises:

- a transverse and longitudinal single-mode diode laser 21 which has high power, more than about 100 mW, and delivers the light beam 1;
- an optical assembly composed of a collimator 32 and an anamorphic system 33. The collimator makes it possible to convert the divergent light beam delivered by the diode laser into a parallel light beam. For its part, the anamorphic system makes it possible to change the elliptical cross-section of the said beam into a circular cross-section having a small diameter, of the order of one millimeter;
- deviation means comprising a prism Pr and a mirror $M_1$;
- an optical emission system 01 which focuses the beam 1 at its focus. This creates the measurement volume, the characteristics of which are as follows.

Distance from the emission lens 01: 100 mm

Diameter at $1/e^2$ distance: 100 µm

Incidence/optical axis: 100 mrad

Geometry of the wavefront: plane

The reference channel comprises:
- a part which is in common with the emission channel and is composed of the diode laser, the collimator and the anamorphic system;
- starting from the prism Pr, the emission channel and the reference channel split. Almost all of the energy (around 96%) is sent to the emission channel. The remaining part 3 of the energy (about 4%) is reflected to the reference channel. It is important that excessive energy which is capable of saturating the optical detection means is not sent in the direction of the said detection means;
- the reflected beam 3 is deviated by mirrors $M_2$, $M_3$, $M_4$ and $M_5$ so as to fold the light beam 4 and equalize the optical paths of the light beams 3 and 4 on the reference and reception channels;
- afocal means composed of the lenses 03 and 04 make it possible to create a large-dimension plane wave whose geometrical characteristics are identical to those of the beam 3 after it has passed through the lens 01;
- a semi-silvered plate SR having a low reflection coefficient (about 4%) makes it possible to superimpose the reference channel and the reception channel, i.e. beams 4 and 3;
- a focusing lens 02 focuses the reference beam 4 at a short distance from the detection means, in this case a photodiode 22. This short distance may typically be close to 2 mm. There is thus a match between the working surface of the photodiode and the cross-section of the light beam 4.

The reception channel essentially comprises, on the path of the back-scattered light beam 3:

- the lens 01 which is in common with the emission channel and makes it possible to convert the spherical wavefront of the light beam scattered by the aerosol into a plane wavefront;
- a narrow-band optical filter F (of the solar filter type);
- the focusing lens 02 and the photodiode 22, which are in common with the reference channel;
- on-board means 23 for processing the signal, so as to provide indications regarding the desired velocity.

According to another variant of the invention, means are provided for illuminating a particle, moving with a velocity $\vec{v}$ with respect to the probe, with a plurality of light beams having different incidences.

By using at least two beams which are sent one after the other, it is possible to measure two components of the velocity which are in the plane defined by the two light beams.

Figure 4:
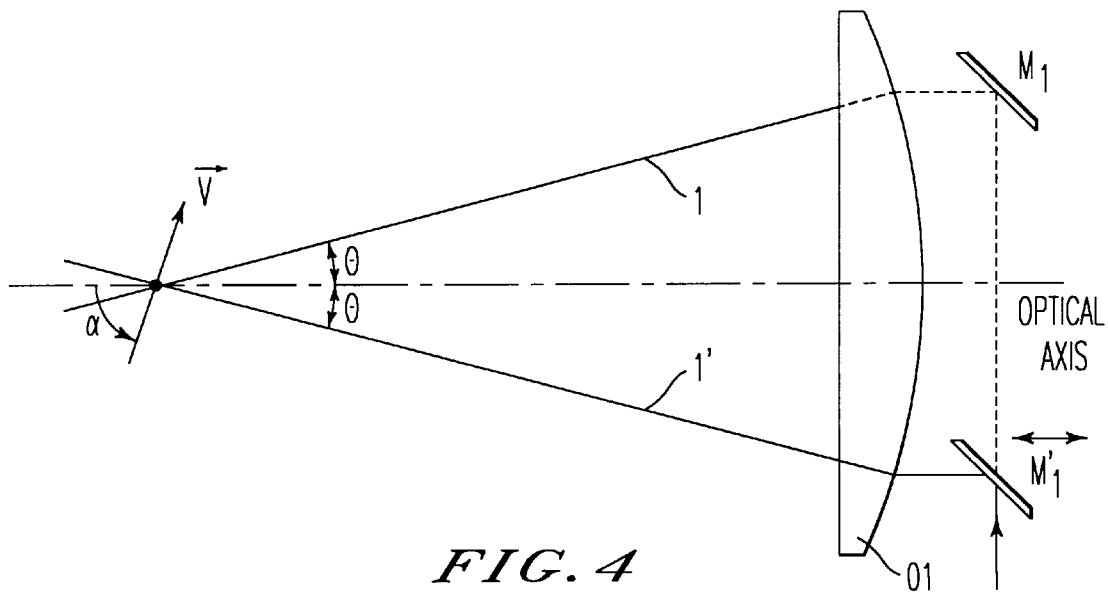
FIG. 4 illustrates an example of a velocimetric probe according to the invention, using a removable mirror so as to create two light beams 1 and 1' incident on the measurement volume.

FIG. 4 illustrates an example in which the mirror $M_1$ described above is coupled to a mirror $M'_1$, in the vicinity of the lens 01. The mirror $M_1$ is retracted periodically, making it possible for either the beam 1 or the beam 1' to be generated outside the probe. The first beam is inclined with respect to the optical axis by an angle $+\theta$, and the second beam is inclined with respect to the optical axis by an angle $-\theta$.

When a particle passes through the measurement volume created by one of the two beams, with a velocity v and an incidence a with respect to the optical axis, the optical signal which is generated is modulated at one of the frequencies $f_1$ or $f_2$, the values of which are respectively:

$$f_1 = 1/\lambda \cdot v\sin\left(\frac{\pi}{2} - \alpha - \theta\right) \text{ for beam 1}$$

$$f_2 = 1/\lambda \cdot v\sin\left(\frac{\pi}{2} - \alpha + \theta\right) \text{ for beam 1'}$$

On the basis of determining the frequencies $f_1$ and $f_2$, it is possible to calculate v and $\alpha$.

For values of $\alpha$ equal to $\pi/2-\theta$ and $\pi/2+\theta$, one of the two frequencies cancel out, which makes the measurement more complicated. In order to overcome this drawback, a third light beam may be created, for example on the optical axis, so that at least two frequencies are not-zero irrespective of the incidence.

In order to measure three components of the velocity, the velocimetric probe according to the invention comprises means for generating three beams which do not lie in the same plane and which are sent in succession.

Thus, when a particle passes through the measurement volume generated by one of the three beams, it will create a signal modulated at a frequency depending on the inclination of the beam with respect to the optical axis and the components of the velocity. Knowing the three frequencies associated with the three beams makes it possible to determine the three components of the velocity.

In the following paragraph, we will describe the operation of this type of optical velocimetric probe.

When particles, and in particular particles constituting an atmospheric aerosol, having dimensions very much smaller than the wavelength of a light ray which irradiates them, pass through the measurement volume $MV_1$, these particles scatter a spherical wave whose complex amplitude can be written:

$$A_d = A_e r \cdot e^{j2\pi[\Delta_0 + \sin\theta]/\lambda}$$

with $A_e$: amplitude of the emission wave r: amplitude back-scatter coefficient of the particle $\lambda$: emitted wavelength z: position of the particle following the z axis, as described in FIG. 2.

Figure 3:
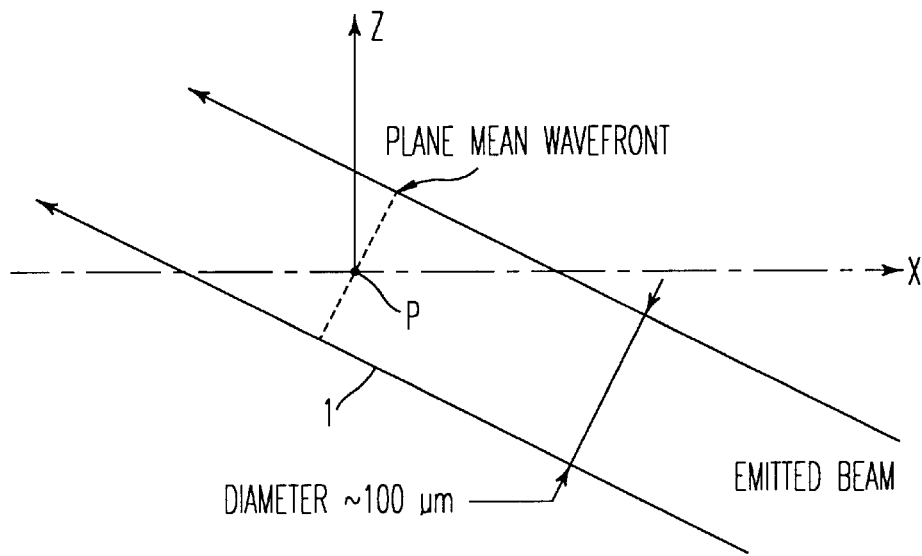
FIG. 3 illustrates the measurement volume $MV_1$ irradiated by the light beam 1.

FIG. 3 illustrates the beam 1 emitted in the direction of the measurement volume $MV_1$ through which particles P pass.

$\theta$: inclination of the emission beam with respect to the optical axis $\Delta_o$: optical path from the source to the measurement volume.

After passing through the lenses 01 and 02, the spherical wave relating to the light beam 3 will be focused in the focal plane of the lens 02. The amplitude of this wave can be written, ignoring optical transmission factors:

$$A'_d = A_d e^{j2\pi\Delta_1/\lambda}$$

with $\Delta_1$ the optical distance separating the measurement volume and the focal plane of the lens 02.

This leads to: $A'_d = A_e r e^{j2\pi[\Delta_0 + \Delta_1 + z\sin\theta]/\lambda}$ The reference channel generates a spherical wave relating to the light beam 4, the amplitude of which can be written:

$$A_r = A_{ro} e^{j2\pi\Delta_2/\lambda}$$

Thus, at the photodiode 22, the waves $A'_d$ and $A_r$ interfere while having spherical wavefronts; the variable part of the interference phenomenon is:

$$A = 2r A_e A_{ro} \cos(2\pi[(\Delta_0 + \Delta_1 - \Delta_2) + z\sin\theta]/\lambda)$$

If the optical paths are balanced between the reference and reception channels, then:

$$\Delta_0 + \Delta_1 - \Delta_2 = 0$$

and $$A = 2\pi A_e A_{ro} \cos(2\pi z \cdot \sin\theta/\lambda)$$

If the particle passes through the measurement volume at a velocity v, then it is also possible to write:

with $z = vt$ $A = 2r \cdot A_e \cdot A_{ro} \cdot \cos(2\pi v \cdot t \cdot \sin\theta/\lambda)$ A time-domain signal modulated at the following frequency is thus obtained:

$f = v\sin\theta/\lambda$

Figure 1:
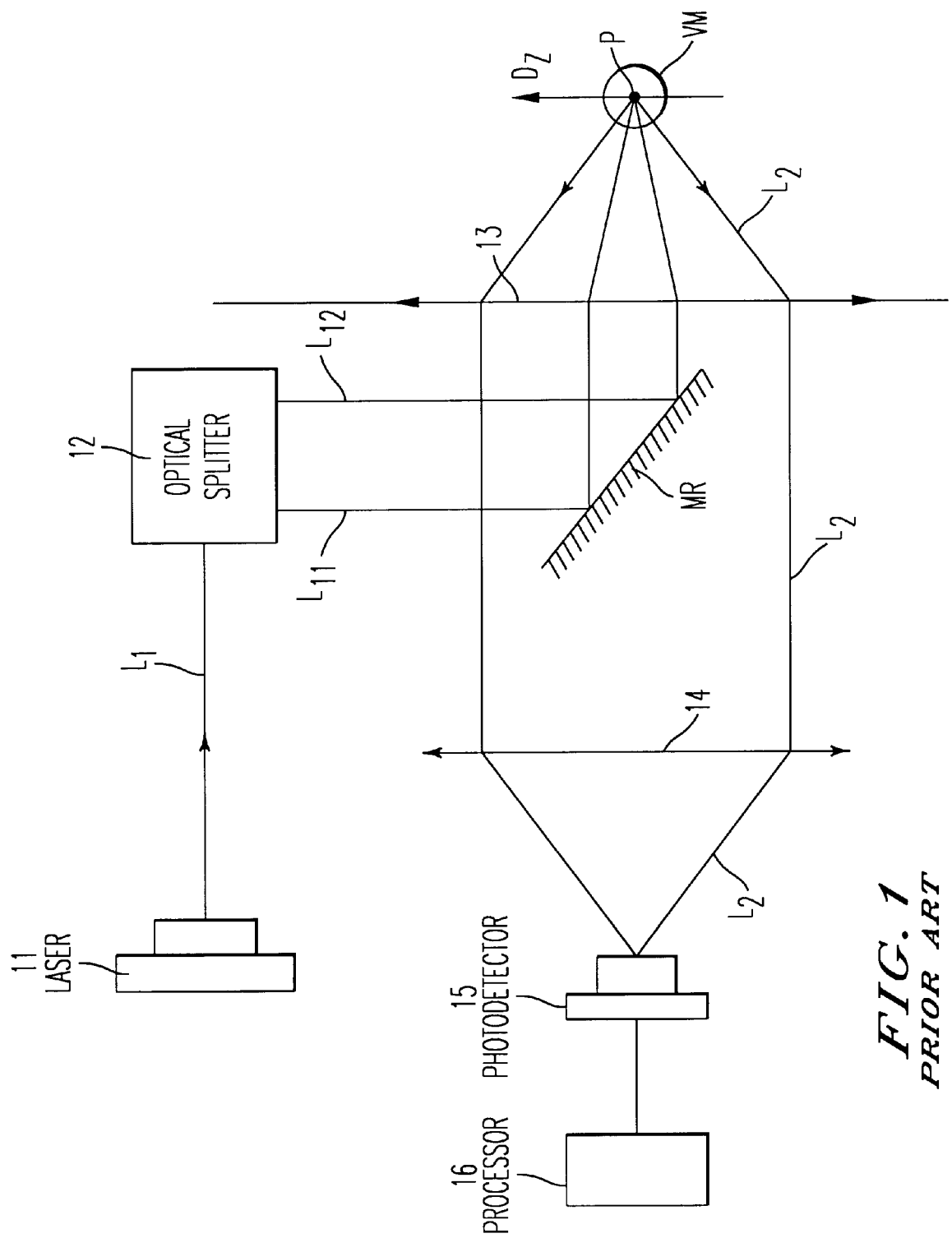
FIG. 1 illustrates an optical velocimetric probe according to the prior art.

With a conventional-fringe probe as described in FIG. 1, in which two incident beams are made to interfere in the measurement volume through which a particle passes, the amplitude of the variable part of the interference phenomenon can be written:

$$A_F = 2r^2 A_e^2 \cos(2\pi vt/\lambda)$$

The gain in amplification between the prior art probe and the probe of the invention is therefore:

$$G = A/A_F = r \cdot A_e \cdot A_{ro}/r^2 A_{e2} = A_{ro}/r A e = [IR/RI_e]^{1/2}$$

If $I_R$ is the intensity of the reference beam $I_r = A^2 ro$ $I_e$ is the intensity of the emitted beam $I_e = Ae^2$ R is the intensity reflection coefficient of the particle $R = r^2$ In conventional fashion, $I_e$ is of the order of $10^{-1} W$ $I_R$ is of the order of $10^{-4} W$ for a value R of the order of $10^{-7}$.

$F \approx [10^{-4}/10^{-1 \times 10^{-7}}]^{1/2} 100$

I claim:

1. An optical velocimetric probe configured to measure particles in relative motion with respect to the probe, said probe comprising:

an illuminating device configured to illuminate, with a first light beam, a measurement volume through which said particles pass, wherein said illuminating device includes a focusing means configured to focus said first light beam on said measurement volume;

means for optical detection of a second light beam which includes a third light beam back scattered by the particles in order to produce an electric signal in response to the passage of one of said particles through the measurement volume;

a device configured to provide a reference light beam from said first light beam;

a device configured to produce interference between said reference light beam and said third light beam wherein said interference is contained in said second light beam, wherein a wavefront of the third light beam and a wavefront of the reference light beam are planar and have substantially identical geometries when interfering.

2. The probe according to claim 1 including a device for deviating a portion of said first light beam in order to provide said reference light beam.

3. The probe according to claim 2 wherein said device for deviating includes a prism.

4. The probe according to claim 1 further including a device for alternately producing at least two first light beams for illuminating the measurement volume at different in order to detect different spatial components of the relative velocity with a particle with respect to the probe.

5. The probe according to claim 4 wherein said device for producing at least two light beams includes a single illumination source and at least one removable mirror in a path of said at least two light beams.

6. The probe according to claim 2 further including a device for alternately producing at least two first light beams for illuminating the measurement volume at different angles of incidence in order to detect different spatial components of the relative velocity with a particle with respect to the probe.

7. The probe according to claim 3 further including a device for alternately producing at least two first light beams for illuminating the measurement volume at different angles of incidence in order to detect different spatial components of the relative velocity of a particle with respect to the probe.

8. An optical velocimetric probe configured to measure particles in relative motion with respect to the probe, said probe comprising:

an illuminating device configured to alternately produce at least two first light beams which illuminate a measurement volume at different angles of incidence, wherein said illuminating device includes a focusing means configured to focus said first light beams on said measurement volume and said particles pass through said measurement volume;

means for optical detection of a second light beam which includes alternate third light beams, corresponding to said first light beams, back scattered by the particles in order to produce an electric signal in response to the passage of one of said particles through the measurement volume;

a device configured to provide a reference light beam as a plane wave from at least one of said first light beams;

a device configured to produce interference between said reference light beam and said third light beams wherein said interference is contained in said second light beam;

a processor adapted to derive different spatial components of a relative velocity of a particle with respect to the probe based on the detection of said second light beam.

9. The probe according to claim 8 further including a device configured to form said third light beams as plane waves in order to produce interference with said plane wave reference light beam.

10. The probe according to claim 8 including a device configured to deviate a portion of at least one of said first light beams in order to provide said reference light beam.

11. The probe according to claim 10 wherein said device for deviating includes a prism.

12. The device according to claim 8 wherein said device configured to produce at least two first light beams includes a single illumination source and at least one removable mirror in a path of said at least two light beams.

* * * * *